United States Patent
Nandi

(10) Patent No.: US 12,514,525 B2
(45) Date of Patent: Jan. 6, 2026

(54) RADIOPHARMACEUTICAL DISPENSING SYSTEMS

(71) Applicant: Jubilant Pharma Holdings Inc., Yardley, PA (US)

(72) Inventor: Indranil Nandi, Yardley, NJ (US)

(73) Assignee: JUBILANT DRAXIMAGE INC. (CA)

( * ) Notice: Subject to any disclaimer, the term of this patent is extended or adjusted under 35 U.S.C. 154(b) by 630 days.

(21) Appl. No.: 17/905,106

(22) PCT Filed: Mar. 25, 2021

(86) PCT No.: PCT/US2021/024206
§ 371 (c)(1),
(2) Date: Aug. 26, 2022

(87) PCT Pub. No.: WO2021/195414
PCT Pub. Date: Sep. 30, 2021

(65) Prior Publication Data
US 2023/0110526 A1    Apr. 13, 2023

Related U.S. Application Data

(60) Provisional application No. 63/001,048, filed on Mar. 27, 2020.

(51) Int. Cl.
*A61B 6/00* (2024.01)
*G06F 21/55* (2013.01)

(52) U.S. Cl.
CPC ............. *A61B 6/48* (2013.01); *G06F 21/55* (2013.01)

(58) Field of Classification Search
CPC .......... A61B 6/48; A61B 6/037; A61B 6/481; G06F 21/55; H04L 63/145
See application file for complete search history.

(56) References Cited

U.S. PATENT DOCUMENTS

| | | | |
|---|---|---|---|
| 2005/0108557 A1* | 5/2005 | Kayo | H04L 63/1416 713/189 |
| 2008/0177126 A1* | 7/2008 | Tate | A61M 5/14 604/526 |
| 2009/0013409 A1* | 1/2009 | Wenzinger | G06F 21/575 726/24 |
| 2009/0166370 A1* | 7/2009 | De Turk | G21F 5/015 221/282 |
| 2010/0286512 A1* | 11/2010 | Dhawale | G21F 5/018 600/431 |
| 2011/0008254 A1* | 1/2011 | Roed | A61K 9/0019 424/1.85 |
| 2011/0022191 A1* | 1/2011 | Amit | G06F 9/542 700/40 |

(Continued)

Primary Examiner — Michael Collins
(74) Attorney, Agent, or Firm — William D. Hare; McNeely, Hare & War, LLP

(57) ABSTRACT

Present invention relates to safety features for radiopharmaceutical dispensing system, wherein dispensing system comprises a controller, a source of radiopharmaceutical and other components. The controller is configured to perform automated quality control of the system to ensure that the system complies quality control before radioactive dose dispensing. The quality control comprises scanning the dispensing system, network or connected devices for an unauthorized connection, malware and ensure that system is free of any such cybersecurity threat before dispensing a radioactive dose.

15 Claims, 3 Drawing Sheets

(56) References Cited

U.S. PATENT DOCUMENTS

| | | | | |
|---|---|---|---|---|
| 2011/0178359 A1* | 7/2011 | Hirschman | .............. | G21G 4/08 |
| | | | | 600/4 |
| 2013/0053446 A1* | 2/2013 | Muzzio | ................... | A61P 25/06 |
| | | | | 222/23 |
| 2013/0102772 A1* | 4/2013 | Eshima | .................... | G21G 1/10 |
| | | | | 53/473 |
| 2013/0123567 A1* | 5/2013 | Agamaite | ............. | A61M 5/142 |
| | | | | 600/4 |
| 2018/0093035 A1* | 4/2018 | Hidem | ................ | A61M 5/1452 |
| 2020/0016284 A1* | 1/2020 | Schimmoeller | ..... | A61M 5/1408 |
| 2022/0409793 A1* | 12/2022 | Marotta | ............. | A61M 1/1561 |

\* cited by examiner

RADIOPHARMACEUTICAL DISPENSING SYSTEMS

TECHNICAL FIELD

The present disclosure relates to the field of nuclear medicine and, in particular, to the radiopharmaceutical system for dispensing of radioisotopes into containers or dosage forms for administration to patients for diagnosing and/or treatment of a disease.

BACKGROUND

Radiopharmaceuticals play a pivotal role in the diagnosis and mitigation of various diseased conditions. The radioisotopes for pharmaceutical use are produced either by nuclear bombardment in cyclotron or in-situ by employing radioisotope generators. The bulk radiopharmaceuticals produced are then supplied to hospitals, pharmacies, or institutes for dosing and administration to patients.

A number of scientific uses require relatively small aliquots of radioactive materials. For example, nuclear medicine employs solutions of radioisotopes such as Technetium-99m($^{99m}$Tc), Iodine-123($^{123}$I), Iodine-125($^{125}$I), Iodine-131 ($^{131}$I), Sodium Iodide ($^{123}$I, $^{124}$I, $^{125}$I, $^{131}$I), Phosphorous-32($^{32}$P), Indium-111($^{111}$In), Cobalt-57($^{57}$Co), Ammonia-13 ($^{13}$N), Sodium fluoride($^{18}$F) or Flourine-18($^{18}$F), Lutetium Lu-177($^{177}$Lu), Radium-223($^{223}$Ra), Samarium-153 ($^{153}$Sm), Thallium-201($^{201}$Tl), Yttrium-90($^{90}$Y), Chromium-51($^{51}$Cr), Gold-198 ($^{198}$Au) and $^{225}$Ac(Ac-225) as radiopharmaceuticals or as radioactive tracers. These radioisotopes are typically measured and dispensed for shipping and administration. For safety reasons, it is appropriate that the operator measuring and dispensing radioisotopes should not be exposed to radioactive radiations. In the production of radiopharmaceuticals used in diagnostic imaging, a relatively large quantity of the radiopharmaceutical may be prepared in a source vial. In some applications, it is desirable to transfer the radiopharmaceutical from the source vial into a relatively clean vial or appropriate pharmaceutically acceptable dosage form for shipment.

In recent years, regulatory agencies have raised several concerns over cybersecurity in healthcare. United States Food and Drug Administration (USFDA) emphasized the importance of effective cybersecurity to ensure medical device functionality and safety with the increasing use of wireless, internet and network-connected devices, portable media and the frequent electronic exchange of medical device related health information. Further, cybersecurity threats to the healthcare sector have become frequent, severe and more clinically impactful. Cybersecurity incidents have rendered medical devices and hospital networks inoperable disrupting the delivery of patient care across healthcare facilities in the United States of America and globally.

Radiopharmaceutical dispensing systems include various components like a controller, pumps, valves, sensors, radiopharmaceutical source, cabinet, shielded assembly, shielded chambers, tubings, activity detector, dose calibrator, computer, internal memory, user interface, motors, syringes, pipettes, needles, exhaust, filters, and other accessories. The controller is the key component of the radiopharmaceutical dispensing system which controls most of the system operations. Radiopharmaceutical dispensing systems may be connected to one or more equipment or networks like imaging systems, infusion systems, hospital networks, pharmacies, servers, radionuclide manufacturer or supplier, remote computers, iPads, mobile tablets, mobile phones, smart watches or like. The radiopharmaceutical dispensing system may be connected via wired or wireless connections like Local Area Network (LAN), internet, communication ports, Wireless Fidelity (WiFi), Universal Serial Bus (USB), Bluetooth, Cables, Compact Disc, Digital Video Disc and/or combinations thereof.

Due care is taken by the radiopharmaceutical professionals to isolate radiopharmaceutical dispensing system from the network, internet, or other connections as much as possible, however, sometimes it becomes necessary to connect such systems to other devices or networks via various channels for the exchange of information with healthcare professionals and for maintenance or updation of the system. The increased use of the internet to make use of the collected information on the dispensing system in other health systems has made such systems vulnerable to cybersecurity threats. The recent advancement in technology has made the radiopharmaceutical dispensing systems automated which can be controlled by the controller or computer via the user interface. Automation of dispensing systems have made such systems safe and efficient in dispensing of radiopharmaceuticals. However, automation also carries a risk of cyber threat by attacking the systems, networks or connected devices with malware which can alter operations of dispensing systems like calibration, quality control or dosing of radioactive material to be dispensed which could cause radiation exposure to the operator or patients.

Radiopharmaceutical dispensing systems carry radiation hazards for the users, operators, technician and/or patients hence cybersecurity is the need of the hour in view of increasing connectivity obligations and imminent cybersecurity threats. Thus, there is a need for ensuring the cybersecurity of the radiopharmaceutical dispensing systems.

SUMMARY

The present disclosure provides quality control and monitoring mechanisms for radiopharmaceutical dispensing systems.

It is an object of the present disclosure to enhance the safety of the radiopharmaceutical dispensing systems by ensuring cybersecurity compliance prior to dispensing a radiopharmaceutical. The present invention relates primarily to ensuring cybersecurity in the process of dispensing a radiopharmaceutical.

It is an object of the present disclosure to enhance the safety of the radiopharmaceutical dispensing systems, wherein the controller is configured to detect an unauthorized connection and/or malware in the system, network or connected devices.

It is an object of the present disclosure to enhance the safety of the radiopharmaceutical dispensing system, wherein the controller is configured to ensure that the system is free of an unauthorized connection and/or malware.

It is an object of the present disclosure to enhance cybersecurity of the radiopharmaceutical dispensing system, wherein the controller is configured to scan the system, network, or connected devices for detecting an unauthorized connection and/or malware prior to dispensing of the radiopharmaceutical to ensure that the system is free from an unauthorized connection and/or malware.

It is an object of the present disclosure to enhance the safety of radiopharmaceutical dispensing system by scanning system, network, or connected devices for an unauthorized connection and/or malware during operation of the system.

It is an object of the present disclosure to enhance cybersecurity of the radiopharmaceutical dispensing system, wherein the controller is configured to scan the system, network, or connected devices for an unauthorized connection and/or malware continuously during the operation of the dispensing system to ensure the system is free from unauthorized connection and/or malware.

It is an object of the present disclosure to enhance cybersecurity of the radiopharmaceutical dispensing system, wherein the controller is configured to scan the system, network, or connected devices for an unauthorized connection and/or malware at a predetermined interval of time to ensure the system is free from an unauthorized connection and/or malware.

It is an object of the present disclosure, wherein the controller of the radiopharmaceutical dispensing system is configured to alert the operator about an unauthorized connection and/or malware.

It is an object of the present disclosure, wherein the controller of the radiopharmaceutical dispensing system is configured to force the system into safe mode in case an unauthorized connection or malware is detected.

It is an object of the present disclosure, wherein radiopharmaceutical dispensing system controller is configured to halt the operation of the system in case any threat of an unauthorized connection or malware is detected and halt system operations till the malware is neutralized.

The Present Disclosure Concerns any of the Following Items:

A radiopharmaceutical dispensing system for dispensing a radioactive dose into a dosage form, the dispensing system comprises; a source of a radiopharmaceutical, a controller, a dose calibrator, a diluent reservoir, a waste reservoir, wherein the controller is configured to perform quality control test comprising; a connection scan on the system, on a network connected to the system or on a device connected to the system in order to confirm the absence of an unauthorized connection; a malware scan on the system, on a network connected to the system or on a device connected to the system in order to confirm the absence of a malware; a calibration of radiopharmaceutical source to determine radioactivity, whereby the radiopharmaceutical dispensing system is configured to dispense at least one radioactive dose.

The radiopharmaceutical dispensing system, wherein the dispensing system does not administer dispensed radioactive dose to a patient.

A radiopharmaceutical dispensing system for dispensing a radioactive dose into a dosage form, comprising a source of a radiopharmaceutical, a controller, a dose calibrator, a diluent reservoir, a waste reservoir, wherein the controller is configured to perform quality control test comprising; a connection scan on the system, on a network connected to the system or on a device connected to the system in order to confirm the absence of an unauthorized connection; a malware scan on the system, on a network connected to the system or on a device connected to the system in order to confirm the absence of a malware; a calibration of radiopharmaceutical source to determine radioactivity, whereby the radiopharmaceutical dispensing system is configured to dispense at least one radioactive dose in a dosage form wherein the dispensing system does not administer the dosage form to a patient.

The radiopharmaceutical dispensing system, wherein the controller is configured to allow the operation of the dispensing system after the quality control is found to be acceptable.

The radiopharmaceutical dispensing system, wherein the quality control test is performed automatically.

The radiopharmaceutical dispensing system, wherein the dispensed radioactive dose comprises a solid, liquid or gaseous dosage form.

The radiopharmaceutical dispensing system, wherein the quality control test cannot be circumvented.

The radiopharmaceutical dispensing system, wherein the controller is configured to halt the system operation in case quality control testing is interrupted.

The radiopharmaceutical dispensing system, wherein the controller is configured to perform additional quality control test comprising verification of volume of the diluent in the reservoir, the volume of the waste container, tubing or container leakage, tubing blockage, temperature, humidity, the volume of the source radioisotope, volume and activity of the dispensed radioisotope.

The radiopharmaceutical dispensing system, wherein the radioactive dose ranges from about 0.0001 mCi to about 20,000 mCi.

The radiopharmaceutical dispensing system, wherein the source of radiopharmaceutical is selected from Technetium-99m($^{99m}$Tc), Iodine-123($^{123}$I), Iodine 124($^{124}$I) Iodine-125 ($^{125}$I), Iodine-131($^{131}$I), Sodium Iodide ($^{123}$I, $^{124}$I, $^{125}$I, $^{131}$I), Phosphorous-32($^{32}$P), Indium-111($^{111}$In), Cobalt-57($^{57}$Co), Erbium-169($^{169}$Er), Gallium ($^{67}$Ga), Gallium ($^{68}$Ga), Ammonia-13($^{13}$N), Sodium fluoride($^{18}$F), Flourine-18 ($^{18}$F), Lutetium Lu-177($^{177}$Lu), Radium-223($^{223}$Ra), Samarium-153($^{153}$Sm), Thallium-201($^{201}$Tl), Yttrium-90($^{90}$Y), Chromium-51($^{51}$Cr), Holmium-166($^{166}$Ho) Rhenium-186 ($^{186}$Re), Rhenium-188($^{188}$Re), Rubidium-81($^{81}$Rb), Strontium-89 ($^{89}$Sr), Actinium-225 ($^{225}$Ac), Xenon (Xe-133, Xe-127), and Gold-198 ($^{198}$Au).

The radiopharmaceutical dispensing system, wherein the malware comprises a virus, a worm, a trojan horse, a ransomware, a spyware, an adware, a scareware, a keylogger, a mirai, a reaper, a emotet, a bot, a botnet, a rootkit or combinations thereof.

The radiopharmaceutical dispensing system, further comprises an intrusion detection system, a firewall, or a sandboxing, wherein said intrusion detection system, firewall, or sandboxing is embedded in the system or located remotely.

The radiopharmaceutical dispensing system, wherein the controller is further configured to perform an unauthorized connection and/or malware scan continuously in the background.

The radiopharmaceutical dispensing system, wherein the controller is further configured to perform an unauthorized connection and/or malware check at a predetermined interval of time.

The radiopharmaceutical dispensing system, wherein upon detection of an attempt to connect to the system, the controller is configured to execute the following actions in case any connection attempt is detected on the system:
  a) provide an alert to the user about said attempt that request confirmation of the authenticity of said attempt;
  b) stop the system operation in case the user fails to authenticate the detected attempt to connect the system.

The radiopharmaceutical dispensing system, wherein the controller is configured to stop the system operation in case malware is detected on the system by the malware scan until the malware is neutralized.

The radiopharmaceutical dispensing system, wherein the controller is configured to repeat the quality control tests in case malware and/or an unauthorized connection is detected on the system.

The radiopharmaceutical dispensing system, wherein the controller is configured to force the system into safe mode in case malware and/or an unauthorized connection is detected on the system.

The radiopharmaceutical dispensing system, wherein the controller is configured to display an error or warning to alert the operator in case an unauthorized connection or malware is detected.

A radiopharmaceutical dispensing system for dispensing a radioactive dose into a dosage form, the dispensing system comprises; a source of a radiopharmaceutical, a controller, a dose calibrator, a diluent reservoir, a waste reservoir, wherein the controller is configured to perform quality control test comprising; a connection scan on the system, on a network connected to the system or on a device connected to the system in order to confirm the absence of an unauthorized connection; a malware scan on the system, on a network connected to the system or on a device connected to the system in order to confirm the absence of a malware; a calibration of radiopharmaceutical source to determine radioactivity, wherein the controller is configured to halt the system operation in case quality control is interrupted or circumvented.

A radiopharmaceutical dispensing system for dispensing a radioactive dose into a dosage form, the dispensing system comprises; a source of a radiopharmaceutical, a controller, wherein the controller is configured to perform quality control test comprising; a connection scan on the system, on a network connected to the system or on a device connected to the system in order to confirm the absence of an unauthorized connection; a malware scan on the system, on a network connected to the system or on a device connected to the system in order to confirm the absence of a malware; a calibration of radiopharmaceutical source to determine radioactivity, wherein the source of radiopharmaceutical comprises Iodine-123($^{123}$I), Iodine 124($^{124}$I) Iodine-125 ($^{125}$I), Iodine-131($^{131}$I), Sodium Iodide ($^{123}$I, $^{124}$I, $^{125}$I, $^{131}$I).

BRIEF SUMMARY OF DRAWINGS

Further features and advantages of the present disclosure will become apparent from the following detailed description, taken in combination with the appended drawings, in which.

DETAILED DESCRIPTION

Figure 1:
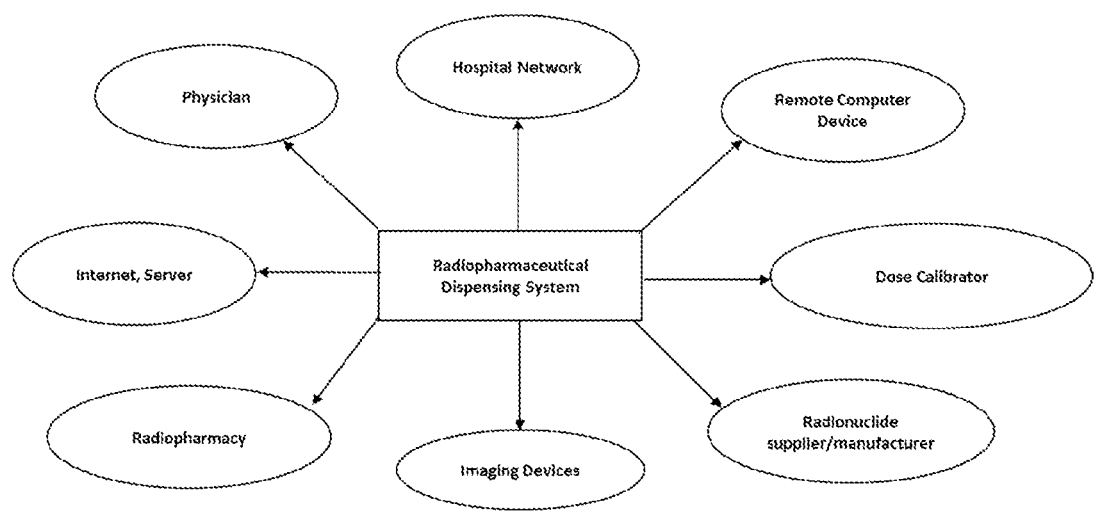
FIG. 1 is a block diagram schematically illustrating a radiopharmaceutical dispensing system and its possible connections to other systems, networks, servers and devices.
Figure 2:
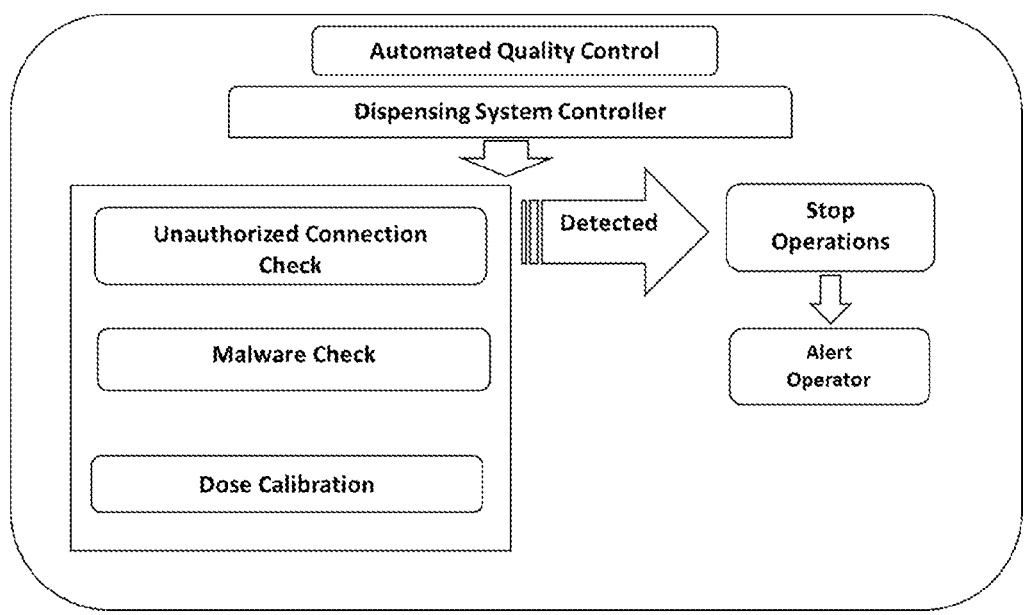
FIG. 2 is a block diagram schematically illustrating one aspect of radiopharmaceutical dispensing system automated quality control.
Figure 3:
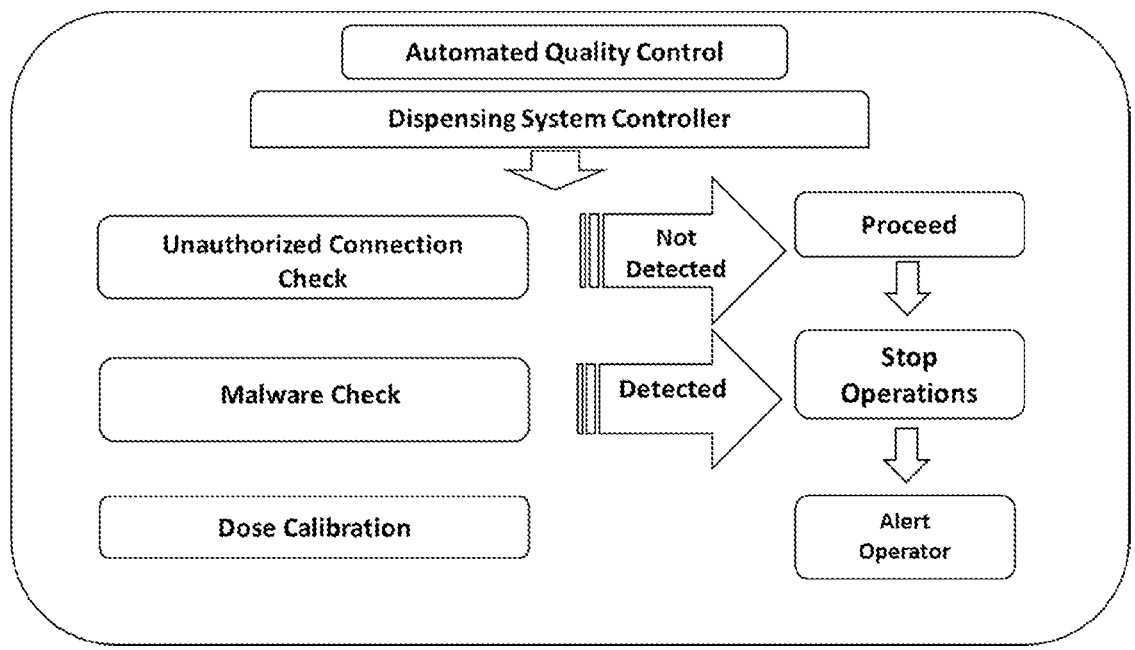
FIG. 3 is a block diagram schematically illustrating another aspect of radiopharmaceutical dispensing system automated quality control.
Figure 4:
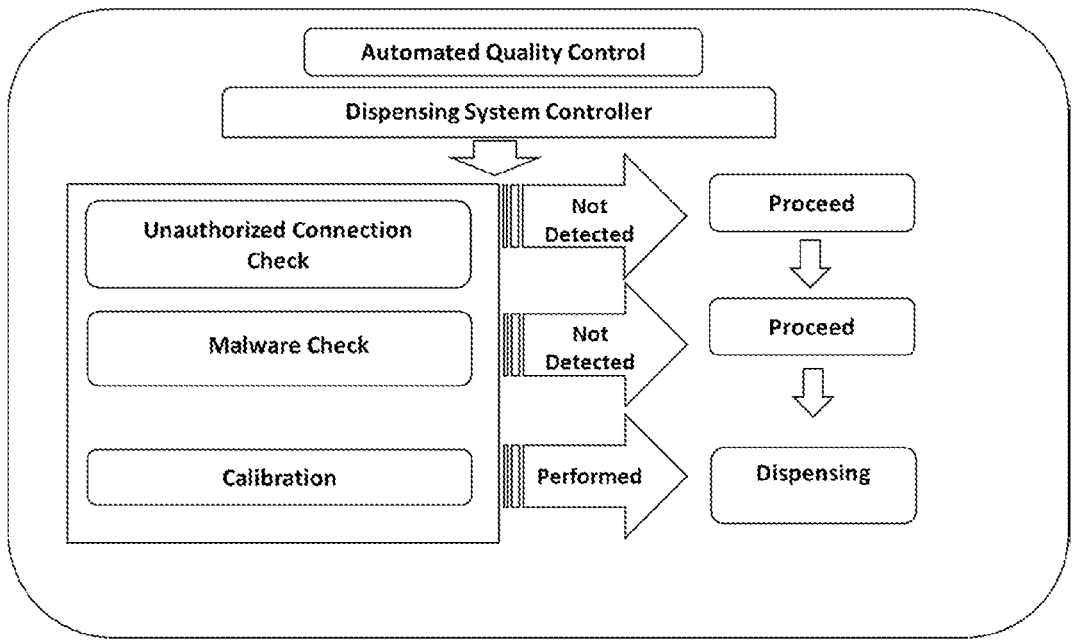
FIG. 4 is a block diagram schematically illustrating yet another aspect of radiopharmaceutical dispensing system automated quality control.

The present inventive subject matter can be more readily understood by reading the following detailed description of representative embodiments.

As used herein, "radiopharmaceutical dispensing system" according to the present invention comprises one or more systems for dispensing a radioactive dose. The radiopharmaceutical dispensing system of the present invention may be connected to a network or other devices. Dispensing of a radioactive dose is understood herein to be different from administration of a radioactive dose. Dispensing of a radioactive dose is understood to be a process in which the final output of the process is a dose suitable for administration to a patient or is in a form easy to dilute or reconstitute for administration to a patient. In contrast, an infusion system is used to administer a radioactive dose to a patient, wherein the radioactive dose was dispensed by the dispensing system. The differences between dispensing and infusion systems are emphasized herein because of the very different needs and concerns with each system. Typically, an infusion system for a radioactive dose will be operated adjacent to and in connection with a patient receiving the infusion. The operator will be a physician or nurse skilled and trained in the administration of such radioactive doses. In contrast, a dispensing system will be operated by technician trained in the use of the dispensing system and the handling of bulk radioactive compounds. The skills and training for the professional infusing the radioactive dose will be very different from those of the professional dispensing the radioactive dose. The inventor has realized that these two different steps in the overall process of creating a radioactive bulk compound, dispensing the radioactive bulk compound into a radioactive dose and administering the radioactive dose to a patient involve concerns that are not necessarily in common. Hence, the inventor has focused herein on the step of dispensing the radioactive bulk compound into a radioactive dose and ensuring the cybersecurity of the overall process.

As used herein, the term "radiopharmaceutical or radioactive dose" comprises radioisotope/radionuclide used in the field of nuclear medicine or pharmaceuticals for diagnosis, treatment or imaging. The radioisotopes according to the present invention comprises radionuclide that may decay by emitting different types of ionizing radiation: alpha ($\alpha$), beta ($\beta-$), positron ($\beta+$) and gamma ($\gamma$) radiation. Non limiting examples include, Technetium-99m($^{99m}$Tc), Iodine-123 ($^{123}$I), Iodine 124 ($^{124}$I) Iodine-125($^{125}$I) Iodine-131($^{131}$I), Sodium Iodide ($^{123}$I, $^{124}$I, $^{125}$I, $^{131}$I), Phosphorous-32($^{32}$P), Indium-111($^{111}$In), Cobalt-57($^{57}$Co), Erbium-169($^{169}$Er), Gallium ($^{67}$Ga), Gallium ($^{68}$Ga), Ammonia-13($^{13}$N), Sodium fluoride($^{18}$F) Flourine-18 ($^{18}$F), Lutetium Lu-177 ($^{177}$Lu), Radium-223($^{223}$Ra), Samarium-153($^{153}$Sm), Thallium-201($^{201}$Tl), Yttrium-90($^{90}$Y), Chromium-51($^{51}$Cr), Holmium-166($^{166}$Ho), Rhenium-186($^{186}$Re), Rhenium-188 ($^{188}$Re), Rubidium-81 ($^{81}$Rb), Strontium-89 ($^{89}$Sr), Actinium-225 ($^{225}$Ac), Xenon (Xe-133, Xe-127) and Gold-198 ($^{198}$Au). The dispensed radiopharmaceutical dose comprises solid or liquid dosage, gaseous form which can be used for administering to the patients via an oral, intravenous or inhalational route. In other embodiment, the dispensed dose of radiopharmaceutical, after being dispensed, then can be administered via automated infusion system. In one embodiment of the present invention, the system is capable of dispensing radioactive doses ranging from about 0.0001 to about 100,000 mCi.

In another aspect of the present invention, the radiopharmaceutical dispensing system comprises one or more components selected from a controller connected to the computer or user interface, pumps, valves, sensors, radiopharmaceutical source, cabinets, shielded assemblies, tubings, activity detector, dose calibrator, computer, internal memory, motors, syringes, pipettes, needles, exhausts, filters, diluents/solvents reservoirs and other accessories. The radiopharmaceutical dispensing system can be used for dispensing of radioactive dosage forms like capsules, liquid or gas. In one embodiment, the dosage forms of the present invention can be prepared automatically.

The term "capsule" as used herein is intended to refer to a pharmaceutical preparation comprising a hard or soft shell containing a single dose of the radiopharmaceutical for oral administration. The shell of the capsule may be made from a biodegradable material, for example gelatin, starch, or other like substances, which upon contact with digestive fluids allows the release of active contents. The capsule may further comprise excipients such as diluents, fillers, surface-active agents, preservatives, colours, sweeteners, flavouring agents, stabilizers, binders, lubricants, disintegrating agents, reducing agents, antioxidants, buffers, solubilizers, and solvents or combinations thereof.

As used herein, the term "diluent/filler" includes, but is not limited to, a material that may comprise liquid, solid, or gaseous materials suitable for dilution of one or more pharmaceutical agents, mixtures or materials. Diluents may comprise various materials including, but not limited to, water, saline solutions, flushing media. In some embodiments, the diluent may be physically and/or chemically mixed with a radiopharmaceutical agent to prepare a mixture capable of providing a predetermined radiation dose. Suitable diluents include, but are not limited to microcrystalline cellulose, dibasic sodium phosphate, sodium alginate, microfine cellulose, lactitol, cellulose acetate, kaolin, lactose, maltose, trehalose, starch, pregelatinized starch, sucrose, xylitol, sorbitol, dextrates, dextrin, maltodextrin, compressible sugar, confectioner's sugar, polydextrose, fructose, calcium carbonate, calcium sulfate, calcium phosphate, dibasic calcium phosphate, tribasic calcium phosphate, magnesium carbonate, magnesium oxide, sodium chloride, potassium chloride, mannitol, dextrose or any mixtures thereof. The diluent may be kept in a container that can be placed inside the assembly or can be placed outside the assembly. The controller is configured to confirm the type or volume of diluent present in the diluent container. In an embodiment, in case the controller does not find a suitable diluent in the container, the controller is configured to halt the system for further operation. In another embodiment, in case the controller does not find suitable amount/volume in the diluent container, the controller is configured to provide an alert of low diluent volume and in case the volume reaches near-empty value or lower volume limit which can be set by the operator, the controller is configured to halt the system.

As used herein, the term 'reducing agent' is an element or compound that loses (or "donates") an electron to an electron recipient (oxidizing agent) in a redox chemical reaction. Reducing agents according to the present invention comprises sodium thiosulfate, sodium sulphite, sodium bisulfite, cysteine hydrochloride, and stannous chloride or mixtures thereof.

As used herein, the term 'stabilizer' is a chemical that is used to prevent degradation. Suitable stabilizing agents according to the present invention include, but not limited to, disodium edetate, butylated hydroxyanisole, butylated hydroxytoluene, sodium metabisulfite, propyl gallate, cysteine, alginic acid, ascorbic acid, bentonite, calcium acetate, sodium acetate, sorbitol, calcium alginate, calcium stearate, cyclodextrins, dimethicone, pentetic acid, phenol, zinc acetate and benzyl alcohol or mixtures thereof.

As used herein, the term 'lubricant' can improve flowability and aid unit operations. Suitable lubricants include stearic acid, zinc stearate, sucrose stearate, sodium benzoate, calcium stearate, adipic acid, glyceryl palmitostearate, glycerine monostearate, medium-chain triglycerides, glyceryl behenate, sodium lauryl sulphate, sodium stearyl fumarate, magnesium lauryl sulphate, magnesium stearate, and polyethylene glycol or mixtures thereof.

Suitable buffers according to the present invention include but not limited to dibasic sodium phosphate anhydrous, meglumine, sodium bicarbonate, sodium carbonate, sodium citrate, calcium gluconate, disodium hydrogen phosphate, dipotassium hydrogen phosphate, tripotassium phosphate, sodium tartrate, sodium acetate, calcium glycerophosphate, tromethamine, magnesium hydroxide, aluminum hydroxide, dihydroxy aluminum sodium carbonate, calcium carbonate, calcium hydroxide, aluminum phosphate, aluminum carbonate, dihydroxy aluminum amino acetate, magnesium oxide, magnesium trisilicate, magnesium carbonate or combinations thereof.

As used herein, the term 'automatically or automated' comprises operations which do not require human intervention.

As used herein, the term 'neutralize' refers to removing or neutralizing a malware or unauthorized connection from the system, connected devices, or network.

Figure 5:
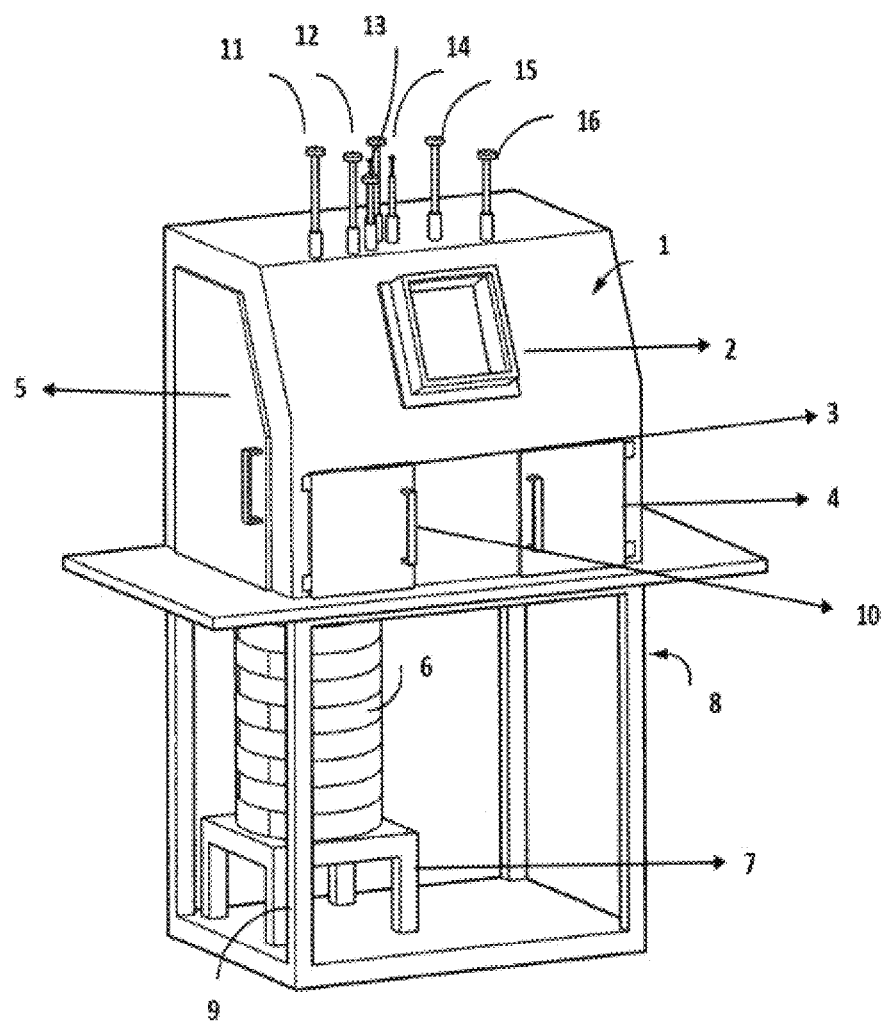
FIG. 5 illustrates a radiopharmaceutical dispensing system for filling, mixing, and dispensing the radioactive dose.
Figure 6:
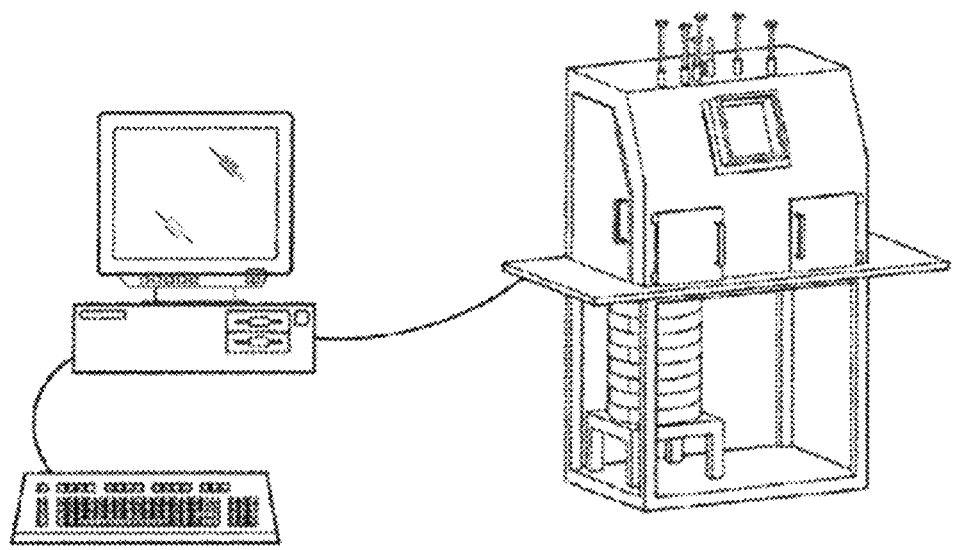
FIG. 6 illustrates a radiopharmaceutical dispensing system comprising a computer or controller.

FIG. 5 illustrates a radioactive dispensing system of the invention that includes a shielding cover (1) that defines a chamber. Any variety of shielding materials can be used that provides an effective barrier to the potentially hazardous material and are either capable of forming a closed surface shape that defines a chamber or being disposed upon a substantially closed-surface shape that defines a chamber. Representative shielding materials include metals, alloys and/or polymers, preferably lead, tungsten, and other suitable metals and alloys that provide an effective barrier to radioactive species. Dispensing systems of the invention include channels extending through the shielding material into the chamber. Channels according to the invention are substantially hollow structures that supply a pathway for introducing containers to the chamber. The channels may be made from any suitable shielding material such as lead, tungsten or any other metals to provide an effective barrier to radioactive species. In cross-section, the channel may have any shape, provided that the shape allows the container to pass through the channel. Preferably, the shape of the channel corresponds to the shape of the container. In certain embodiments of the invention, channels can be interchangeable such that each is adapted for use with specific containers. Channels according to the invention can optionally include a device or other structure that permits manipulation of objects in the chamber. The system also includes a plurality of doors (3-5) for accessing the chamber. These doors may be constructed of any suitable shielding material and may comprise handles (10), hinges, locks, or other features typically found on doors. The dispensing system further comprises one or more rods (11-16) which extends through the shield and into the chamber. At least one of the rods is hollow and thus can serve as a channel through which a container can pass into the chamber. At least one of the rod is rotatable to provide movement of components disposed inside the chamber. In an embodiment, a dose calibrator (6) is associated with the system. In another embodiment, a dose calibrator can be on board or off board. The dose calibrator can be placed on a stand (7). The dose calibrator is provided with the necessary logic and components to measure the radioactivity of the dispensed materials. Dose calibrator can be electronically or communicatively coupled to the controller via wired or wireless connection. The radioactive dispensing system according to the present invention comprises a window (2) for viewing the chamber. The window may be formed from transparent radiation shielding material like leaded glass. The radiopharmaceutical dispensing system can be placed on the table (8) or carried on a movable cart having wheels for ease of movement. For example, the radiopharmaceutical dispensing system can be carried on a movable cart so that it can be in proximity to the radiopharmaceutical infusion system.

The radiopharmaceutical dispensing systems of the present invention also include one or more securing units that are disposed in the chamber proximal to the channel and adapted to receive a container through the channel. Securing units according to the invention generally are capable of receiving one or more containers. The portion of the securing unit that receives the container preferably has a shape that corresponds to the shape of the container. In embodiments wherein, the securing unit receives more than one container like capsules or vials, the securing unit is capable of being indexed, that is, of moving each container sequentially past a given work area. Indexing is useful for allowing the securing unit to receive further containers to allow the containers to be filled and/or to move the containers to an area where they may be removed from the securing unit.

The dispensing system comprises a diluent container or reservoir which can be made of plastic, glass or any other suitable compatible material and can be present inside the system assembly or can be placed outside the system by hanging with a hook. The system may further comprise one or more waste container which holds the radioactive or non-radioactive waste placed inside the shielded assembly to prevent exposure of radiation to patients or operators. The volume of the waste container may range from about 1 mL to about 10,000 mL. Preferably, the volume is between 100-1000 mL. In an embodiment, the controller is configured to monitor the volume of waste container and provide an alert to the operator about predetermined set volume level to prevent overfill and spillage of radioactive waste. Overfill of the waste container may cause radiation hazard and may also cause damage to electrical circuits, shock and/or fire. For monitoring the volume of waste container, an overflow switch is provided for example ELS-1100 (Gems Sensors, Connecticut, USA) Electrooptic Level Switch. The predetermined volume can be set by the operator depending upon the usage via the user interface. The controller provides an alarm to the operator about the volume of the waste container and is configured to prevent further operations of the system until the waste is emptied. In alternate embodiments, the waste container can be emptied automatically into another container placed outside the system which can be disposed of suitably. Automatic emptying of waste can be performed using a pump and valves which direct the waste into a suitable container located outside the system for disposal. Similarly, the volume of the diluent container is monitored by the controller and the controller is configured to provide an alert to the operator about predetermined low volumes. The predetermined low volume can be set by the operator which is used by the controller to provide low diluent volume alerts. The volume of the diluent container ranges from about 10 mL to about 10,000 mL. Type of diluent is also equally important because a wrong diluent can cause incompatibility leading to a wrong dose of radiopharmaceutical or adverse effects therefore, the controller is configured to confirm the type of diluent as set by the operator and in case the diluent does not match with the preset diluent, the controller is configured to provide an alert to the operator and halt further operations till diluent is changed by the operator with a suitable diluent. As should be evident, the variables described above relating to the dispensing system are dissimilar from the variables relating to an infusion system because of the differences in converting a bulk radioactive agent and excipients into a radioactive dose compared to administering the dispensed dosage form to a patient.

The dispensing system may include a plurality of ports to receive plurality of containers. In an embodiment, the container is an empty capsule, vial, or syringe, although all other types of containers can also be used. In this embodiment, containers are introduced to the ports via a channel formed in the rod. It is understood that the channel has a sufficient diameter to allow the container to pass. In certain embodiments of the invention, the channel is treated with a lubricant to reduce friction for comfortable passage of the container. In an embodiment, the dispensing system comprises a chamber for stocking the radioactive material to be dispensed. The stock solution chamber is made up of shielded material. The solution delivery device is used to fill the container with a stock solution. In one embodiment, the solution delivery device is a syringe, other types of devices like pipettes can be used for handling liquid radioactive liquids.

The solution dispensing device is associated with dispensing controls to allow accurate dispensing of the radioactive materials in selected volumes. Although doses may be determined in terms of radioactivity, it is helpful to accurately dispense certain volumes of stock solution to attain the desired radioactivity. In one embodiment, the volume of a dispensed radiopharmaceutical is about 0.001 mL to about 100 mL. Preferably, the volume is about 0.001 mL to about 25 mL, more preferably about 0.001 mL to about 10 mL. In one embodiment, the volume is less than about 10 mL.

Radioactive dispensing system of the present invention may be used to dispense radioactive liquids suitable for oral or intravenous route of administration. The dispensing system comprises one or more pipette assembly, syringe assembly, source of the radiopharmaceutical, shipping vials, actuators, motors, and a controller including other components. The system includes a rotatable support arm, an actuator connected to the support arm and configured to displace the support arm and a pipette assembly mounted to the support arm. The pipette assembly includes a pipette tip having an opening through which liquids are dispensed or aspirated, a piston and a motor connected to the piston for control. In another embodiment of the present invention, the liquid dispensing system comprises one or more motors for the movement of pipettes in a suitable direction. Liquid dosage form according to the present invention can be dispensed in a suitable container like vials, syringes (pre-filled syringes), ampoules or pharmaceutically acceptable sterilized containers. In an embodiment, the vials, syringes are shielded to prevent radiation exposure to patients, operator or a technician. The pH of the liquid dosage form ranges from 3.0 to 10.0, preferably 5.0 to 10.0. The containers are suitably shielded to prevent radiation exposures. In another embodiment, the dispensing system can be optionally connected to an infusion system for administering the dispensed liquid dosage form to the patient. The connected infusion system is automatic in operation. The infusion system may comprise its own controller to control and monitor the operations of the infusion system including quality control. The infusion system may communicate with the dispensing system via wired or wireless means.

The radiopharmaceutical dispensing system comprises one or more dispensing or shipping vials made of shielding material. The shipping vial can be made of glass, plastic, or any other suitable material. The shipping container is larger than the shipping vial. In one embodiment, the dispensing system comprises a system to cap, move, lift, stopper, seal the shipping vial and an aluminium seal is crimped on the capped shipping vial.

The radiopharmaceutical dispensing system of the present invention may be used to assess various aspects of the system such as activity of radioisotope stock solution or source, dose calibration, the activity of dispensed radioactive dosage form, the volume of diluent, waste volume, and volume of radioactive source or stock solution. Information about these aspects of the system may be gathered by various elements of the system and is sent to the controller. The controller may analyse this gathered data to assess the state of the system. In addition, the user interface computer may be configured to communicate with a remote computer, such as servers, networks, other devices or cloud computing services. In an embodiment according to the present invention, the computer may be augmented with a device for user data entry which includes, but not limited to, a storage medium reader, USB port, a scanner, a bar code reader. The scanner or bar code reader can be used for scanning and input about the information of source the vial like volume, manufacturer details, source calibration date, activity remaining in source vial of the radiopharmaceutical, type of radiopharmaceutical, radiopharmaceutical name, intended use, necessary precautions for dispensing, manufacture date, shipping date, licence details, purity, diluent type, diluent volume and/or expiry date of the source radiopharmaceutical and diluent.

The controller includes at least one memory device and a processor that is coupled to the memory device for executing instructions. In this embodiment, executable instructions are stored in the memory device and the controller performs one or more operations described herein. In this embodiment, the controller controls the operation of the dispensing system. The controller according to the present invention includes computing devices such as microprocessors, microcontrollers, capacitors, circuits, switches, logic gates, or equivalent logic devices. In alternate embodiments, the dispensing system provides for data entry to specify the desired volume and radioactivity. The dispensing system may also be used to achieve a certain dosage or concentration, like, if the concentration of radioactive stock solution to be dispensed in a suitable medium like capsules or vials is provided, the system may calculate the volume required to obtain a certain radioactive dose. Further, if a dose of certain radioactivity will be required for administration later (like one or two days), the controller can account for the radioactive decay rate by dispensing an amount that has radioactivity greater than the desired dosage by an amount representing the decay factors occurring over the time between dispensing and administration. The memory device is equipped with information about radiopharmaceutical like half-life, which can be used by the controller to calculate the volume to be dispensed. The controller is configured to perform various operations like quality control, monitoring, calibration, mixing, dilution, filling, dispensing, alerting, warning, and halting. The memory device enables information such as executable instructions and/or other data to be stored and recovered. The memory device may include one or more computer readable media, such as, without limitation, random access memory, a solid-state disk, and/or a hard disk. The controller is connected to the user interface which includes, but not limited to, a screen like LCD or LED. The controller also includes a user input interface in this embodiment. The user input interface is connected to the processor and receives input from the user. The user input interface may include, for example, a keyboard, a mouse, joysticks, a touch screen, and/or audio user input interface. The user interface is a medium between dispensing system and the operator.

In one embodiment, the controller is configured to transfer radioactive liquid from the source to the dispensing vial in response to signals received from the controller. The controller receives an input from the operator via a user input device with a target dose/volume to be transferred from the source vial to the dispensing vial or capsules. The controller controls operation of one or more motors to position the syringe or pipette assembly over the source vial and deliver the stock solution to the dispensing vial, capsule, and/or syringe. The controller is further configured to perform dilution of the radioactive liquid in order to prepare the required dose of the radiopharmaceutical to be dispensed. The dilution can be performed based on the parameters including, but not limited to, activity/concentration of source radioactive, time gap from dispensing to administration to the patients including transportation, half-life of the radioactive substance, dose, and/or the number of patients. The controller provides signals to the system components to manage the movement of diluent or radioactive liquid into the vial or capsule. In alternate embodiments, the dispensing system comprises addition of radioactive dose from the source vial directly into the radiopharmaceutical ligand vials comprising radiopharmaceutical ligands in lyophilized or liquid form. The radiopharmaceutical ligands according to the present invention comprises tetrofosmin, sulfur colloid, aggregated albumin, bicisate, exametazime, mebrofenin, medronate, mertiatide, oxidronate, pentetate, pyrophosphate, sestamibi, tilmanocept, albumin microspheres, etidronate, ferpentetate, gluceptate, lidofenin, pentetreotide, diethylenetriamine pentaacetate (DTPA), octreotide, dotatate, dotatoc, fludeoxyglucose, albumin, teboroxime, hippuran, ibritumomab, prostate specific membrane antigen (Psma) ligands (Psma-11, Psma-617, Psma I&T, Dcfpyl), Florbetapir, Flutemetamol and MIBG (Iobenguane) including their salts or derivatives thereof. In alternate embodiments, the ligands are complexed with chelates and metal ions. The metal ions can be radioactive nuclides or radionuclides. The controller is further configured to perform dose calibration via dose calibrator to confirm the dispensed radioactivity. In other aspect, the dispensed vial can be used by the infusion system to administer the necessary radioactive dose to the patients automatically or it may be further diluted or processed and administered manually to the patients. In an alternate embodiment, the dispensed liquid dosage form in a vial or syringe can be transferred to the infusion system located at other location for administration. When the dispensed dosage form is present in pre-filled syringes it can be administered to patients directly.

According to some embodiments of the present disclosure, the computer of the system includes a monitor. This computer may comprise a touch screen (e.g. LED, LCD) to receive input from the operator. The computer is coupled to the controller of the dispensing system. In alternate embodiments, the computer is coupled to the controller via a wire that allows the computer to be placed somewhat remotely to prevent radiation exposure to the operator. According to other embodiments, the computer is wirelessly coupled. According to other embodiments, the computer is pre-programmed to direct the operator via screen through procedures necessary to maintain, operate the system, to perform quality control tests and for dispensing. The computer may be programmed to interact with the controller of the system in order to keep a tally or count of dispensed activity and/or volume of the isotope. The computer maintains the records of the used and remaining isotope and may automatically alert the operator about lower volume or activity. In alternate embodiments, the computer may be connected to other computers, dispensing systems, pumps, dose calibrators, imaging devices, hospital networks, nursing stations, radioisotope manufacturers or supplier, system manufacturers, authorized third parties responsible for management or maintenance of the dispensing system hardware and software components, personal computers, laptops, iPads, mobile tablets, mobile phones, wearable devices, pharmacies, remote user interface, USB, memory devices, data backup devices and the like. In other embodiments of the present invention, the computer may be coupled with another device for operator data entry, examples of which include, without limitation, a keyboard, a track ball, a storage medium, a reader, a scanner, a bar code reader or other reader of encoded information, a mouse, a joystick, and like. The user interface computer may upload an indication of the result of the assessment to a computer via an authorized communications network. The remote computer may collect information from multiple computers and use this collected information to identify the state of a single dispensing system or aggregate statistics for multiple dispensing systems.

The controller of the device plays an important role in controlling and minimizing exposure to patients and operator. The controller is configured to perform quality control tests. As used herein, "quality control test" refers to the tests performed on daily basis for evaluating the safety and efficacy of the system. Quality control measures may include, but are not limited to, measuring the radioactivity of radioisotope source, measuring the radioactivity of dispensed dose, determining the volume of radioisotope stock solution, the volume of diluent, the volume of waste container, volume of dispensed liquid, checking for leakage or blockages in the tubing or containers, checking sensors and valves functioning, pressure, environment surrounding dispensing system like temperature and humidity, radiation in waste container, scanning the system, network or attached devices for an unauthorized connection and/or malware among other quality control measures. In an embodiment, the controller of the dispensing system is configured to provide error, warning, and/or audible or visual alert to the operator if any of the tests are found to be out of preset limits. The controller may provide an alert to the user about connection attempt and request for confirmation about authenticity of said attempt detected on the system, network or connected devices and stop the system from operating in case the user fails to authenticate the detected attempt to connect. Quality control may be used to generate one or more quality reports, which may include but are not limited to, analytical tests performed on the product, total yield of the products, failure reports for the product, failure reports for the one or more systems used to manufacture the product, and/or operator error reports. In an alternate embodiment, quality control results are displayed on the screen and provide audible and/or visual alerts/alarms to the operator. The alert/alarm may be displayed on the user interface or can also be displayed on a remote computer or system which is connected to the controller for remote operations of the system. In an embodiment, quality control cannot be circumvented. In another embodiment, the controller is configured to force the system in safe mode in case malware or an unauthorized connection is detected on the system, on a network or connected devices. In yet another embodiment, one or more of the automated quality control tests can be performed at night to save daytime or at a predetermined time set by the operator.

In an embodiment, it is important to ensure that system is free of any kind of cyber threat. In an embodiment, unauthorized connection and/or malware scanning should be performed prior to start of the system for dispensing doses. In an alternate embodiment, additional unauthorized connection and/or malware scan can be performed continuously in the background and provide audible and/or visual alerts/alarm to the operator of any cyber threat. In an embodiment, the system comprises an emergency stop button that may stop the system in case the cyber threat could be of potential concern. Pressing the emergency button will force the system into safe mode to prevent alterations in the set dispensing or quality control parameters like dosing of radiopharmaceutical and/or calibration. In order to understand the severity of the threat, the controller is configured to provide a score to every cyber threat. Based on the severity, the controller may provide an alert/alarm and take necessary action for appropriate safety of the system, network devices or data.

In an additional embodiment of the invention, quality control tests are mandatory and cannot be evaded. In case, the operator tries to evade any of the quality control test, the controller is configured to halt the system for any further operations to enhance safety.

As used herein, the term cybersecurity refers to the practice of protecting systems, devices, networks and programs from digital attacks. These cyberattacks are usually aimed at accessing, changing or destroying sensitive information, extorting money from users, or interrupting normal business processes. Vulnerabilities are weaknesses in computer software codes, hardware designs, information systems, security procedures, internal controls or human behavior that could be exploited by a threat. Some of the known vulnerabilities of cyber security include, but not limited to, authentication bypass, buffer overflow, code injection, communication protocol vulnerability, credentials insufficiently protected, cross-site scripting, cryptographic issues, data authenticity insufficiently verified, flash memory content insufficiently protected, hard-coded credentials, improper access control, improper authentication, improper authorization, improper certificate validation, improper control of generation code, improper exception handling, improper input validation, improper restriction of communication channel to intended endpoints, improper restriction of operations within the bounds of a memory buffer, power consumption, leftover debug code, computer operating system vulnerabilities, protection mechanism failure, relative path traversal, insufficient session expiration, untrusted input accepted, and vulnerable third-party software.

In one aspect, the system should be able to mitigate the threat via various controls of the system. This becomes especially important in the case of radiopharmaceuticals, wherein cyber-attacks on the system should be controlled to avoid any potential hazard. In case such threats are not mitigated or controlled the wrong dose of radiopharmaceutical can be dispensed and may lead to overexposure/lower dose of radiation which may lead to wrong diagnosis and/or treatment.

As used herein, a "network" is a group of two or more computer systems linked together. There are many types of computer networks like Local Area Network (LAN), Wide Area Network (WAN), Campus Area Network (CAN), Metropolitan-Area Networks (MAN), and Home Area Network (HAN). The network may include any hardware or software for connecting the computing device in a communicating relationship with other resources through the network. This may include remote resources accessible through the internet as well as local resources using physical connections like ethernet, radio frequency communications like WiFi, optical communications like fiber optics, infrared, ultrasonic communications, or any combination of these or communications through any other media that might be used to carry data between the dispensing system and other devices. The network interface may include a modem, a router, a network card, an infrared transceiver, a radio frequency transceiver, a near field communications interface, a radio-frequency identification tag reader, or the like. The device may be connected to the internet of things for various purposes like tracking of device location using sensors attached to the device for making it visible to hospital and/or pharmacy staff. In an embodiment, the dispensing system may be equipped with various sensors which include, but are not limited to, tracking of consumables like diluent, leakage sensor, low volume or volume overflow sensors, unauthorized touch sensors, temperature and humidity sensors, pressure sensor, radioactivity sensor and magnetic field.

As used herein, the term 'malware' is malicious software intentionally designed to cause damage to a computer, server, client, computer network and device. A wide variety of malware is known, including computer virus, worm, trojan horse, ransomware, spyware, adware, scareware, keylogger, mirai, reaper, emotet, bot, botnet and rootkit. Programs are also considered malware if they secretly act against the interests of the computer user. Malware in the radiopharmaceutical dispensing system can alter intended operations of the system like activity to be dispensed, dosing, volume, dose calibrator or completely stop working of the system. Malware not only affects the system but also can affect other systems in the network and their operations.

There are various types of malware which may enter the system. These are also known as virus and designed to spread from host to host and has the ability to replicate itself. Computer virus cannot reproduce and spread without programming such as a file or document. In other words, a computer virus is a type of malicious code or program written to alter the way a computer operates and is designed to spread from one computer to another. A virus operates by inserting or attaching itself to a legitimate program or document that supports macros in order to execute its code. A virus has the potential to cause unexpected or damaging effects, such as harming the system software functioning by corrupting or destroying data. There are different types of virus or malware which may act differently to affect the system operations which include but are not limited to, boot sector virus which can take control when you start or boot your system and may spread by plugging an infected USB drive into your computer. Web scripting virus exploits the code of web browsers and web pages, when you access such a web page, the virus can infect your computer. Browser hijacker "hijacks" certain web browser functions and you may be automatically directed to an unintended website, resident virus hat inserts itself in a computer system's memory and can execute anytime when an operating system load. Direct action virus comes into action when you execute a file containing a virus otherwise it remains dormant. Polymorphic virus changes its code each time an infected file is executed and does this to evade antivirus programs. File infector virus inserts malicious code into executable files used to perform certain functions or operations on a system. Multipartite virus infects and spreads in multiple ways and can infect both program files and system sectors. Macro virus are written in the same macro language used for software applications such viruses spread when you open an infected document through email attachments.

Malware can be prevented by using anti-malware software, antispyware software, firewalls and Intrusion Detection System (IDS), security scans, regular updates, scanning of every file coming via any authorized or unauthorized source. Firewall is one of the technique, which can be useful in preventing malware. It can regulate traffic being sent out or received on devices, servers, networks and/or web applications. They can block malicious traffic that tries to access these systems, preventing hackers from successfully implanting malware into the system. In an alternate embodiment, even if the system is infected with malware, firewalls may block the outgoing traffic that malware tries to use, stopping trojans and information stealers from transmitting stolen data back to hackers. Sandboxing is another method to prevent malware. It is used to protect computers and networks from more advanced threats that typically evade antivirus software. In this method, dedicated workstations are used to scan files, attachments, and storage devices for malware. Malware can be freely made to cause damage to the sandbox but since sandboxes are isolated devices, malware can be identified while being prevented from coming into contact with the rest of the networks or radiopharmaceutical dispensing system. Another method for malware protection includes content disarm and reconstruction. It sanitizes the files by removing just the malicious code and keeping the document usable. This method is capable of recovering potentially important information from the infected files. In an embodiment according to the present invention, one or more malware detection or defense techniques can be employed for scanning and/or neutralizing the malware threats to the systems. Malware scan can be performed at the start of the system, during quality control, continuously during operations in the background or at predetermined interval of time as determined by the operator. The predetermined time interval for scanning may range from about 1 minute to 24 hours, like 5 minutes, 10 minutes, 20 minutes, 30 minutes, 40 minutes, 50 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours and 24 hours. The controller is programmed to scan according to a predetermined set time interval for malware. In an alternate embodiments, the scanning time intervals can be set by the operator as per convenience.

Intrusion detection systems are one of the techniques, which are suitable for network security and detect any threats at an early stage. The detection system monitors and evaluates network activity to detect any unusual traffic. Intrusion detection systems can be based on artificial intelligence. An intrusion detection system (IDS) is an effective security technology, which can detect, prevent and react to attacks. It monitors sources of activities, network traffic data in device computer or network systems and employs various techniques in order to provide security. Intrusion detection involves data acquisition, data preprocessing, model selection for data analysis and result analysis. In a preferred embodiment, the intrusion detection system is based on artificial intelligence (AI). It provides the advantage to overcome the problem of false positives and advantageous for dispensing system to minimize false positives and false alarms and disruptions in the systems. Another advantage of AI based systems is that AI's can learn new rules automatically, whereas in earlier systems the security manager adds new rules for each new type of threat or attack on the network or the system. AI based machine learning and deep learning are other important aspects of cybersecurity of radioisotope dispensing systems and their connected networks. It is based on a large number of sample data, machines use pattern recognition to develop models that can be applied to new and unknown situations. AI based mechanisms like IDS, machine learning and deep learning can work in real time and provide round the clock protection to radiopharmaceutical dispensing systems and networks associated with them. The cybersecurity provisions according to the present invention includes firewall, anti-virus, AI based softwares, machine learning and deep learning based softwares or hardware. The cybersecurity softwares can be embedded in the dispensing system or can be located remotely. AI based softwares or algorithms are self-evolving and are automatically updated based on their experience of threat handling during operation. IDS can be Network Intrusion Detection Systems (NIDS) placed at a strategic point within the network to monitor traffic to and from all devices on the network. It performs an analysis of passing traffic and matches the traffic that is passed on the subnets to the library of known attacks. Once an attack is identified, the alert can be sent to the administrator/controller. NIDS can also be combined with other technologies to increase detection and prediction rates. Artificial Neural Network based IDS are capable of analyzing large volume of data in a smart way due to the self-organizing structure that allows to more efficiently recognize intrusion patterns. Neural networks assist IDS in predicting attacks by learning from mistakes. Host Intrusion Detection Systems (HIDS) run on individual hosts or devices on the network. A HIDS monitors the inbound and outbound packets from the device only and will alert the user or administrator if suspicious activity is detected. In another embodiment, the detection method can be signature based or anomaly based.

In another embodiment, the radiopharmaceutical dispensing systems are capable of securing the data backup automatically at a predetermined interval of time. In an alternate embodiment, backup is then transferred and stored to a cloud backup service. In an alternate embodiment, data transfer can be performed in encrypted form. The predetermined interval of time according to this embodiment comprises an interval of 30 minutes, two hours, four hours, six hours, eight hours, ten hours, twelve hours, fourteen hours, sixteen hours, eighteen hours, twenty hours, twenty-two hours, and twenty-four hours. In an alternate embodiment, data backup time can be set by the operator as per suitability as well. In another embodiment, in case any cyber threat is detected, the controller is configured to perform automatic data backup to a remote secure device, network or data cloud to safeguard the data.

In another embodiment, the malware protection can be multilayered security instead of a single layer for protection. More are the layers of defense, more difficult is for the hacker to access the device. Hence a combination of various malware detection, protection and mitigation strategies are also included in the scope of the invention.

In another embodiment, if an unauthorized connection and/or malware is detected, the controller is configured to repeat quality control to ensure safety.

As used herein, the term 'unauthorized connection' is a connection that is unrecognized and could not be approved by the user, operator or system. The unauthorized connection may extract patient information, confidential information from the system or network. The unauthorized connection can be used to introduce malware or malicious software into the system. In an embodiment, the system comprises a database of IP addresses, which are authorized to be used with the system. The system is configured to identify any new IP address connection attempt to the system and alert the user. The system may also be configured to automatically discard unknown IP address connection requests. The unauthorized connection can be detected by the network monitoring system, which can detect the connection at the start of the system, during quality control, continuously during operations or at a predetermined interval of time as determined by the operator. The predetermined time interval for automatic scanning may range from about 1 minute to about 24 hours, like 5 minutes, 10 minutes, 20 minutes, 30 minutes, 40 minutes, 50 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours and 24 hours. The controller is programmed to scan according to a predetermined set time interval for unauthorized connection. In alternate embodiments, the scanning time intervals can be set by the operator as per convenience.

In an embodiment, the ideal network monitoring system should be automatic, capable of providing an immediate alert to the operator for risk assessment and remediation process. In one embodiment, the unauthorized connection can be wired or wireless. Wired connection includes but not limited to High Definition Multimedia Interface (HDMI), Radiofrequency (RF), Video Graphics Array (VGA), Digital Visual Interface (DVI), USB (Universal Serial Bus), Compact Disc (CD) and Digital Video Disc (DVD) or combinations thereof. The wireless connection includes but is not limited to WiFi, Bluetooth, Infrared (IR), mobile phone, laptop, personal computer, mobile tablet, iPad, or any combinations thereof.

The input/output source of the device may support input from and output to and from other devices that might couple to the computing device. This may, for example, include serial ports, Universal Serial Bus (USB) ports, optical ports, ethernet ports, telephone ports, audio jacks, component audio/video inputs, HDMI ports, and so forth. This may also or instead include an infrared interface, RF interface, magnetic card reader, or other input/output system for coupling in a communicating relationship with other local devices. A USB port is used to attach to a WiFi accessory or where an ethernet connection is used to couple to a local network attached storage.

The radiopharmaceutical dispensing system according to the present invention comprises a method of dispensing a radiopharmaceutical comprising, performing quality control test; measuring the activity of source radioisotope; adding the source radiopharmaceutical to the dispensing container; optionally, diluting the radiopharmaceutical to prepare an appropriate dose of radiopharmaceutical; measuring the radioactivity of final radioactive dose via dose calibrator; dispensing the radiopharmaceutical in solid, liquid or gaseous dosage form; and optionally, transferring the dispensed radiopharmaceutical container to the connected infusion system for administration to the patients.

In one of the embodiment, the present invention provides a method of dispensing radiopharmaceutical composition of Sodium Iodide (I-131) in a safe and accurate manner automatically. The composition comprises solid or liquid dosage form for oral administration. The composition comprises one large capsule and one small capsule for each dose prepared. Each large capsule is empty and each small capsule contains about 50 to about 300 mg of dibasic sodium phosphate anhydrous USP as the absorbing buffer. In alternate embodiments, the amount of absorbing buffer may vary depending on the dose or activity to be dispensed. The controller performs the scanning of the system, network or any connected devices for any unauthorized connection and malware, the dispensing system then calibrates the radioactivity of I-131 source solution or may be obtained from the source label attached to the container along with the calibration date. The operator enters the dose required and controller calculates the amount/volume of source I-131 solution required to prepare the said dose. The prepared or dispensed dose is then calibrated before shipping and administration to the patient. Similarly, liquid dose of I-131 can be dispensed accordingly in a suitable container like vial, syringes like pre-filled syringes. Radioactive doses of ligands comprising tetrofosmin, sulfur colloid, aggregated albumin, bicisate, exametazime, mebrofenin, medronate, mertiatide, oxidronate, pentetate, pyrophosphate, sestamibi, tilmanocept, albumin microspheres, etidronate, ferpentetate, glucaptate, lidofenin, pentetreotide, diethylenetriamine pentaacetate (DTPA), octreotide, dotatate, dotatoc, fludeoxyglucose, albumin, teboroxime, hippuran, ibritumomab, prostate specific membrane antigen (Psma) ligands (PSMA-11, PSMA-617, PSMA I&T, DCFPyL), Florbetapir, Flutemetamol and MIBG (Iobenguane) can be prepared by addition of radioactive source solution automatically by the dispensing system.

In another embodiment according to the present invention, the dispensed doses of radiopharmaceutical can be used for imaging, diagnosing, and/or treatment of thyroid cancer, hyperthyroidism, thyroid carcinoma, cardiovascular conditions, neuroendocrine tumors, thrombocythaemia, polycythaemia vera, skin cancer, eye cancer, prostate cancer, uveal melanomas, brain tumors, thrombus detection, localization of inflammation and abscesses, sympathoadrenal system tumors, pheochromocytoma, neuroblastoma, ganglioneuroma, paraganglioma, gastroenteropancreatic tumors, carcinoid, insulinoma, medullary thyroid cancer, pituitary adenoma, small cell lung cancer, anemia, and gastrointestinal bleeding.

Embodiments of the invention may be implemented on a radiopharmaceutical dispensing system that comprises a controller. The embodiments can be implemented to enhance the safety of radiopharmaceutical dispensing systems via automated quality control mechanisms.

The embodiments of the invention described above are intended to be exemplary only.

What is claimed:

1. A radiopharmaceutical dispensing system for dispensing a radioactive dose into a dosage form, the dispensing system comprising:
    a source of a radiopharmaceutical, a controller, a dose calibrator, a diluent reservoir, and a waste reservoir,
    wherein the controller is configured to perform quality control test on the dispensing system, the quality control test comprising:
    (a) a connection scan on the system, on a network connected to the system or on a device connected to the system in order to confirm the absence of an unauthorized connection;
    (b) a malware scan on the system, on a network connected to the system or on a device connected to the system in order to confirm the absence of a malware; and
    (c) an alert sent by the system to an operator upon the detection of one or both of a malware and an unauthorized connection on the system;
    wherein the quality control test is performed to ensure that the system is free of a cyber threat before dispensing the radioactive dose to a patient;
    wherein the controller is configured to provide a score of severity to every cyber threat;
    wherein the controller is configured to provide an alert to an operator for safety of the system, network devices or data; and
    wherein the controller is configured to halt the system operation in case quality control is interrupted or circumvented.

2. The radiopharmaceutical dispensing system according to claim 1, wherein the controller is configured to allow the operation of the dispensing system after the quality control is found to be acceptable.

3. The radiopharmaceutical dispensing system according to claim 1, wherein the quality control test is performed automatically.

4. The radiopharmaceutical dispensing system according to claim 1, wherein the dispensed radioactive dose comprises a solid, liquid or gaseous dosage form.

5. The radiopharmaceutical dispensing system according to claim 1, wherein the quality control test cannot be circumvented.

6. The radiopharmaceutical dispensing system according to claim 1, wherein the controller is configured to further perform additional quality control test comprising verification of volume of the diluent in the reservoir, volume of the waste container, tubing or container leakage, tubing blockage, temperature, humidity, volume of the source radioisotope, volume and activity of the dispensed radioisotope.

7. The radiopharmaceutical dispensing system according to claim 1, wherein the malware comprises a virus, a worm, a trojan horse, a ransomware, a spyware, an adware, a scareware, a keylogger, a mirai, a reaper, a emotet, a bot, a botnet and a rootkit or combinations thereof.

8. The radiopharmaceutical dispensing system according to claim 1, wherein the system further comprises an intrusion detection system, a firewall, or a sandboxing, and wherein the intrusion detection system, firewall or sandboxing is embedded in the system or located remotely.

9. The radiopharmaceutical dispensing system according to claim 1, wherein the controller is further configured to perform the unauthorized connection scan on the system and/or the malware scan on the system continuously in the background.

10. The radiopharmaceutical dispensing system according to claim 1, wherein the controller is further configured to perform the unauthorized connection scan on the system and/or the malware check on the system at a predetermined interval of time.

11. The radiopharmaceutical dispensing system of claim 1, wherein upon detection of an attempt to connect to the system, the controller is configured to execute the following actions in case any connection attempt is detected on the system:
    a) provide an alert to the user about said attempt that request confirmation of the authenticity of said attempt; and
    b) stop the system operation in case the user fails to authenticate the detected attempt to connect the system.

12. The radiopharmaceutical dispensing system of claim 1, wherein the controller is configured to stop the system operation in case malware is detected on the system by the malware scan until the malware is neutralized.

13. The radiopharmaceutical dispensing system of claim 1, wherein the controller is configured to repeat the quality control tests in case the malware and/or the unauthorized connection is detected on the system.

14. The radiopharmaceutical dispensing system of claim 1, wherein the controller is configured to force the system into safe mode in case the malware and/or the unauthorized connection is detected on the system.

15. A radiopharmaceutical dispensing system for dispensing a radioactive dose into a dosage form, the dispensing system comprises:
 a source of a radiopharmaceutical, a controller, wherein the controller is configured to perform quality control test on the dispensing system, the quality control test comprising:
  (a) performing a connection scan on the system, on a network connected to the system or on a device connected to the system to confirm the absence of an unauthorized connection;
  (b) performing a malware scan on the system, on a network connected to the system or on a device connected to the system to confirm the absence of a malware;
  (c) performing an automatic data backup to a remote secure device, network or data cloud to safeguard the data if any cyber threat is detected;
 wherein the controller is configured to provide a score of severity to every cyber threat;
 wherein the controller is configured to provide an alert to an operator for safety of the system, network, network devices or data;
 wherein the controller is configured to allow the system operation once the absence of the malware and/or the unauthorized connection is confirmed.

* * * * *